Patented Apr. 12, 1927.

1,624,422

UNITED STATES PATENT OFFICE.

ROBERT B. MILLER, OF JACKSON HEIGHTS, NEW YORK, ASSIGNOR TO WESTERN ELECTRIC COMPANY, INCORPORATED, OF NEW YORK, N. Y., A CORPORATION OF NEW YORK.

DIAL-TESTING CIRCUIT.

Application filed June 30, 1926. Serial No. 119,579.

This invention relates to telephone exchange systems and more particularly to testing equipment for machine switching telephone systems.

The object of this invention is to improve and facilitate the testing of impulse transmitters.

A feature of this invention is the provision of a dial tester circuit common to a plurality of test positions, controllable from a subscriber's station and provided with means for informing the person making the test of the result of such test.

Another feature of this invention is the provision of means associated with a dial tester to transmit distinctive signals indicative of the speed impulses of a dial under test.

An additional feature is the provision of means associated with a dial tester under remote control to determine whether the tester shall function to conduct any one of four tests.

A still further feature of this invention is the provision of means to enable a repeat test to be made without reestablishing the circuits to the dial tester.

The above enumerated features are embodied in a circuit arrangement whereby a test man at a subscriber's station may test the dial at that substation with the minimum of assistance from the test operator. The test operator, at the request of the test man, operates a key which causes the dial test circuit to associate itself with the test cord at the operator's position. With the aid of switching apparatus the test operator connects the test cord with the substation at which the test man is working. The operator also operates a control key to indicate the normal speed of the dial to be tested and the allowable variation in speed.

The dial test circuit automatically resets the dial tester pendulum and transmits a tone to the test man. The test man then dials zero and a switch is stepped for each pulse. At the first pulse the dial tester pendulum is released and at the last pulse an indicator is tripped, operating a relay which completes a tone circuit. A characteristic tone is provided for fast, correct and slow dials and the corresponding relay is operated by the indicator. The circuit is arranged to permit repetition of the test and is only restored completely to normal when the test operator restores the dial test key. The control keys cause the indicator to function with dials giving either ten or twenty pulses per second and also restrict the range of speed over which a "correct" signal will be given when readjusting the dial.

In the drawings, Fig. 1 shows a portion of a test cord including the keys for controlling the dial tester and monitoring keys.

Figure 1:
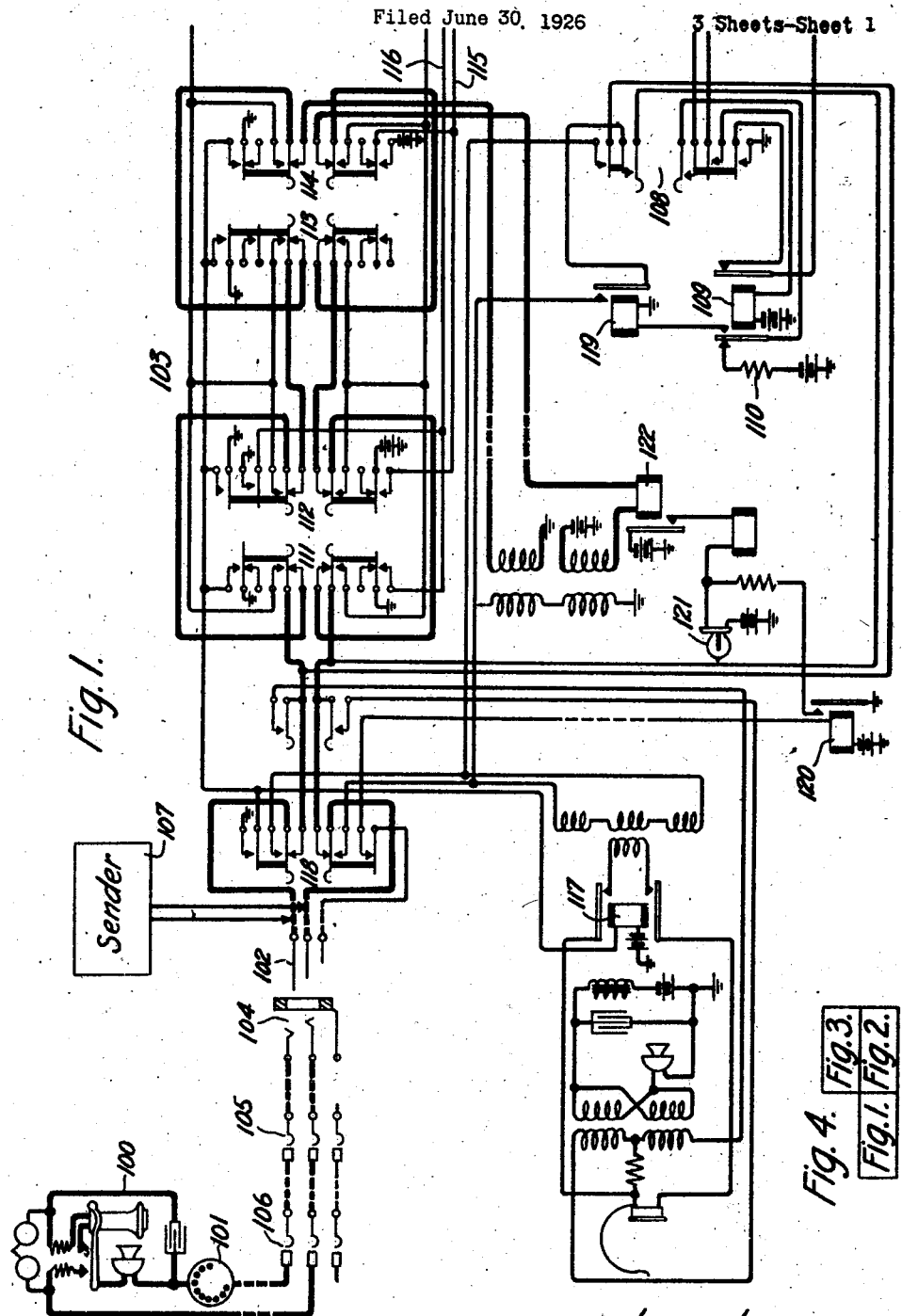
Figure 2:
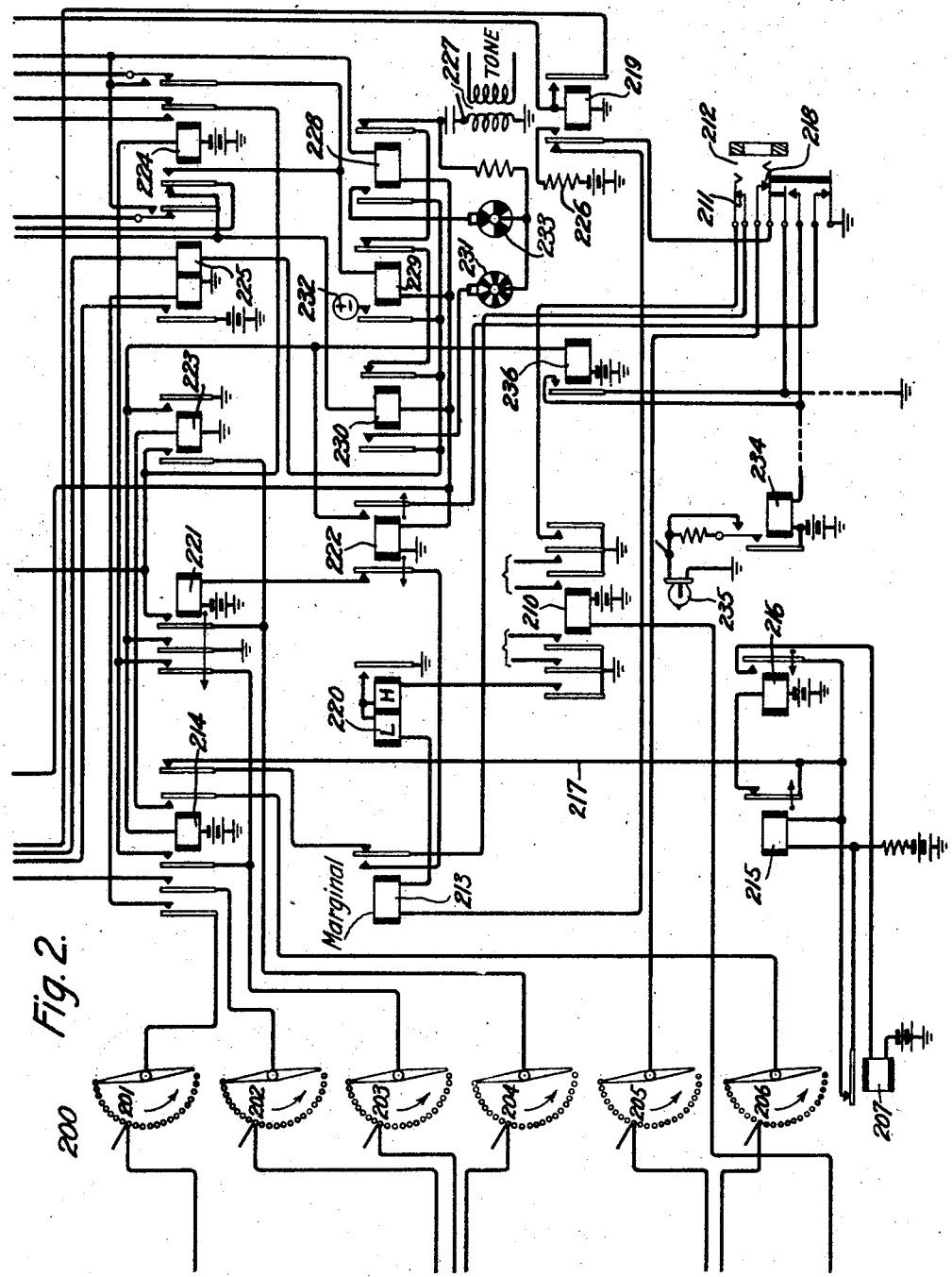
Fig. 2 shows a switch for associating the dial tester with the test cord and other apparatus associated with the dial tester.

The tester cord of Fig. 1 is a portion of one disclosed and claimed in patent to E. R. Lundius, No. 1,577,333, granted March 16, 1926.

Figure 3:
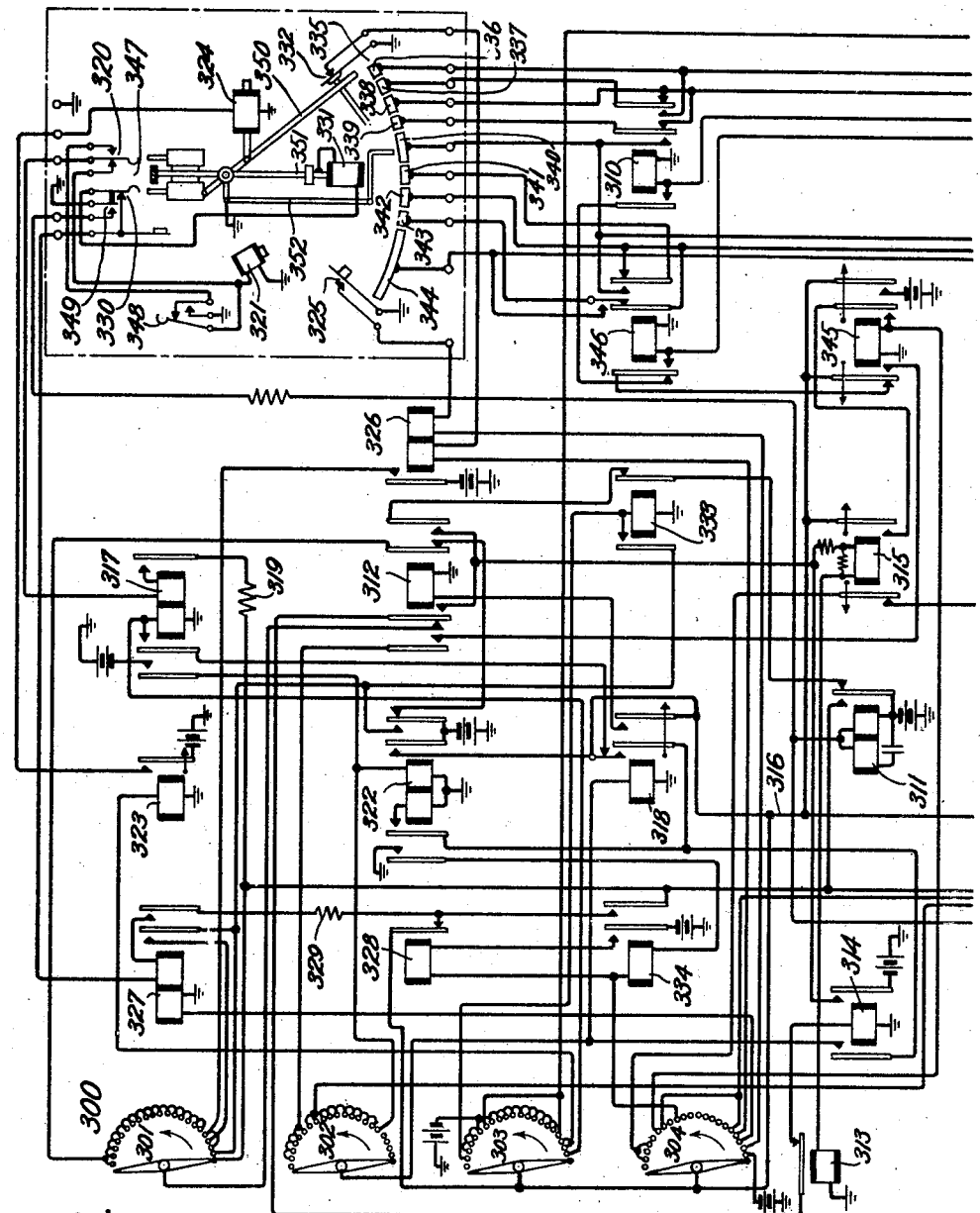
Fig. 3 shows a switch for controlling the application of the tests together with a pendulum type dial tester.

The dial tester shown in the upper right hand corner of Fig. 3 is described and claimed in the application of W. T. Booth and A. C. Magrath, Serial No. 745,030, filed October 21, 1924.

Assuming that the dial 101 of the subscriber's set 100 is to be tested, the testing operator will be informed of the number of that subscriber's line and she will, by means of the plug 102 associated with the test cord 103, obtain connection with the subscriber's line 100 through a jack 104 and test selectors 105 and 106 under the control of her sender 107. The insertion of plug 102 in jack 104 operates relay 120, lighting lamp 121. When the connection has been completed supervisory relay 122 operates shunting the lamp. She will then operate dial test key 108 and one of the control keys 111, 112, 113 or 114, after which the operation will be automatic or under the control of the test man at the subscriber's station. The operation of a control key releases relay 122 and relights lamp 121.

The operation of dial test key 108 will complete a circuit from battery through the winding of start relay 210, right back contact of relay 109, lower contact of key 108 to ground, starting all idle dial testers hunting for the cord 103. The operation of key 108 also connects battery through resistance 110, left back contact of relay 109, inner lower contact of key 108 to the corresponding terminal in the switches, such as switch 200, of all the dial tester circuits, marking the cord for selection.

It also prepares a circuit from battery through the relay 109, middle lower contact of key 108 to the corresponding terminals in the arc served by brush 206 of all the dial tester switches 200.

The operation of relay 210 closes a circuit from ground at its right contact over contact 211 of make-busy jack 212, right back contact of relay 213, right back contact of relay 214, right back contact of relay 215, winding of relay 216 to battery. Relay 216, in operating, closes a circuit from battery through the winding stepping magnet 207, right front contact of relay 216 to the operating ground of relay 216 over conductor 217. A circuit is also closed in parallel with relay 216 from battery through the winding of relay 215 to ground on conductor 217, but relay 215 is prevented from operating by a shunt around that relay at the back contact of magnet 207. When magnet 207 is operated in the circuit previously traced, this shunt circuit is opened and relay 215 operates. Relay 215, in operating, opens the circuit of relay 216 which, in releasing, opens the circuit of magnet 207, permitting that magnet to retract its armature and advance switch 200 to its next terminals. This operation is repeated until brush 205 makes contact with the terminal connected to battery through key 108. When this occurs, a circuit is completed from battery as previously traced over brush 205, contact 218 of jack 212, left back contact of relay 219, winding of relay 213, windings of relay 220, left front contact of relay 210 to ground. Relay 220 operates and closes a shunt around its right hand high resistance winding, permitting the operation of marginal relay 213. The operation of relay 213 opens the circuit of relays 216 and 215 and of magnet 207 so that switch 200 comes to rest in connection with cord 103.

The operation of relay 213 closes a circuit from battery through the winding of relay 221, left back contact of relay 222, front contact of relay 213, contact 211 of jack 212, right front contact of relay 210 to ground. Relay 221 operates and closes an obvious operating circuit for relay 214. Relay 214, in operating, closes a circuit from battery through the winding of relay 109, middle lower contact of key 108, brush 206, right front contact of relay 214, winding of relay 223 to ground. Relays 109 and 223 operate in this circuit. The operation of relay 109 removes battery from the terminal of brush 205, thus releasing relays 213 and 220. It also opens the circuit of relay 210 bringing the remaining dial test circuit switches to rest. The operation of relay 223 closes a holding circuit for relay 214 which does not release prematurely since relay 221 is slow to release. Relay 223 also closes an obvious energizing circuit for relay 236 which relay closes a portion of an all circuits busy arrangement.

The apparatus is arranged to test either high speed or low speed dials and to impose either test or readjust speed limits upon the dial. Distinction between these conditions is brought about by the operation of one of the keys 111, 112, 113 or 114 in the test cord. One of these keys is operated for each test. Key 114 is operated to test a low speed dial at readjust limits; key 113 for a low speed dial at test limits; key 112 for a high speed dial at readjust limits; and key 111 for a high speed dial at test limits. The operation of either key 112 or 114 connects battery over conductor 115, brush 204, left front contact of relay 223, inner right armature of relay 224, through the winding of either relay 310 or relay 346 to ground, rearranging the segments of arc 335 of the dial tester to set readjust limits. With either key 111 or 112 operated, ground is connected to conductor 116 and over brush 203, inner left front contact of relay 214 to the winding of relay 224, which rearranges the segments of arc 335 to indicate correctly in testing a high speed dial. Assuming that the dial 101 is a low speed dial, as subscribers' dials usually are, and that it is to be tested under readjust limits, key 114 will be operated, thus extending the tip and ring conductors from the subscriber's line through the brushes 201 and 202 respectively. When key 114 is operated, a circuit is closed from ground over its uppermost contact to the winding of relay 117, closing a monitoring circuit to the test operator's headset. Another circuit will be closed from battery through the right winding of relay 311, middle left front contact of relay 214, brush 202, inner lower operated contact of key 114, inner lower normal contacts of keys 113, 112, 111 and 118, ring of plug 102 and jack 104, thence over the subscriber's loop through dial 101 back to the tip of jack 104 and plug 102, upper middle normal contacts of keys 118, 111, 112, and 113, inner upper operated contact of key 114 brush 201 outer left contact of relay 214, left winding of relay 225 to ground. Relay 311 in operating closes a circuit from battery over its right front contact, normal contact of brush 301, left back contact of relay 312, back contact of stepping magnet 313, winding of relay 314 to ground. Relay 314, in operating, closes a circuit from battery over its right front contact, winding of relay 315, winding of magnet 313 to ground. Magnet 313 operates, opening the circuit of relay 314, which in turn opens the circuit of the magnet and thus steps switch 300 to position 1. Relay 315 operates but performs no useful function at this time.

In position 1, a circuit is closed from battery over brush 304 to battery feed conductor 316. A circuit is completed from conductor 316 over brush 303, left winding of relay 317 to ground. A circuit is also completed from conductor 316 to ground through the winding of relay 222. Relay 317 in operating locks over its inner left contact to conductor 316 through the inner right normal contact of relay 318. It also closes a circuit from battery over the front contact of relay 311, resistance 319, right front contact and right winding of relay 317, contact 320 of key 347, to ground through the winding of holding magnet 321. It also closes an obvious energizing circuit for relay 322. Relay 322 in operating prepares a locking circuit for itself which will be traced when completed. It also connects a substitute battery to conductor 316. It also completes a circuit from battery over its outer right front contact, No. 1 terminal of brush 301, left back contact of relay 312, back contact of magnet 313 to the winding of relay 314. As previously described, relay 314 causes switch 300 to advance to its next terminals.

With switch 300 in position 2, a circuit is closed from ground through the winding of relay 323, No. 2 terminal of brush 303 to battery on conductor 316. The operation of relay 323 closes a circuit from battery over the front contact of relay 323 to the winding of reset solenoid 324. The operation of this solenoid moves reset arm 350 to the left extremity of its swing. Arm 350 mechanically engages pendulum 351 and trip arm 352. When pendulum 351 reaches its extreme position it comes under the control of the holding magnet 321 where it will be held independent of arm 350. Arm 350 in this position closes contact 325, completing a circuit from ground over contact 325 through the right winding of relay 326, No. 2 terminal of arc 304 to battery over conductor 316. The operation of relay 326 closes a circuit from battery to the No. 2 terminal of arc 301, completing the previously traced circuit for relay 314, and advances switch 300 to position 3. For a complete description of the operation and relative positions of the parts of the dial tester pendulum, reference is made to the above identified Booth-Magrath application.

With switch 300 in position 3, battery is removed from relay 326 and that relay releases. However, the circuit of magnet 324 is maintained at this time to insure the proper centering of trip arm 352. A circuit is completed at this time from ground through the left winding of relay 327, No. 3 terminal of arc 304 to battery over conductor 316. Relay 327, in operating, closes a locking circuit for itself from battery on conductor 316, back contact of relay 328, resistance 329, right front contact and right winding of relay 327, contact 330 of key 347, winding of trip magnet 331 to ground. The energization of magnet 331 holds the trip arm 352 in proper relation to the pendulum 351. The operation of relay 327 also closes a circuit from battery at the outer right front contact of relay 322, inner right contact of relay 327 to No. 3 terminal of arc 301, advancing switch 300 to position 4.

While switch 300 passes from position 3 to position 4, battery is removed from the left winding of relay 327 so that relay 327 remains energized in series with trip magnet 331 at this time. Battery is removed from the winding of solenoid 324 and the reset arm 350 is allowed to swing into its position at the right of the arc where it remains. This prevents it from interfering with the free swing of pendulum 351. When it reaches its extreme right position, a circuit is closed from ground over contact 332, left winding of relay 326, No. 4 terminal of arc 304 to battery on conductor 316. Relay 326, in operating, connects battery as before to arc 301 and advances switch 300 to position 5.

While switch 300 moves from position 4 to position 5, relay 326 is released. A circuit is now completed from battery over the outer right front contact of relay 317, No. 5 terminal of arc 302, winding of relay 318 to ground causing relay 318 to operate. The operation of relay 318 closes a circuit from conductor 316 over the outer right front contact of relay 318, winding of relay 312 to ground. Relay 318 also removes battery from one locking circuit of relay 317 but relay 317 is held operated in series with magnet 321. It completes the locking circuit of relay 322 which may be traced from battery on conductor 316, inner right front contact of relay 318, inner left front contact and left winding of relay 322 to ground.

The operation of relay 312 arranges the circuit of relay 314 to make it function as a pulse helping relay in the subsequent test. It also extends the circuit of magnet 313 to the back contact of relay 311. While switch 300 was in position 4, a circuit was closed from ground through the winding of relay 219, No. 4 terminal of brush 303 to battery on conductor 316. Relay 219 operated and locked to battery at the front contact of relay 311. Relay 219 also completed a circuit from battery through resistance 226, left front contact of relay 219, contact 218 of jack 212, brush 205, inner lower contact of key 108, left front contact of relay 109, winding of relay 119 to ground. The operation of relay 119 completes a monitoring circuit for the test operator. A circuit is now completed from ground, through tone source 227, right back contact of relays 228, 229 and 230, right winding of relay 225, No. 5 terminal of arc 304 to battery on conductor 316. A tone is induced in the left winding of relay 225 and thence over the tip of the subscriber's line informing the test man that the dial tester is ready for operation. This tone is also received at the test desk.

It will be observed that the circuit of holding magnet 321 is completed at the front contact of relay 311. When, now, the tester dials zero for the purpose of testing the speed of the dial, the first release of relay 311 will de-energize magnet 321 and relay 317, permitting the pendulum to swing freely. When relay 311 closes its back contact, a circuit is closed from battery over the back contact of relay 311, back contact of relay 333, front contact of relay 312, winding of relay 315, winding of magnet 313 to ground. A parallel circuit is also completed from the right front contact of relay 312, over the left front contact of that relay, back contact of the magnet 313, winding of relay 314 to ground. Relay 314 when operating connects battery over its right front contact to the windings of relay 315 and magnet 313, thus insuring that magnet 313 will completely attract its armatures and step switch 300 in response to each release of relay 311. Relay 318 is operated in positions 6 to 15 in a circuit from battery over the front contact of relay 225, strapped terminals of arc 302, winding of relay 318 to ground. Relay 225 releases at each dial pulse but relay 314 closes a substitute circuit for relay 318 extending from battery, inner right front contacts of relays 322 and 318, left contact of relay 314 to the winding of relay 318. Relay 318 is slow to release to insure that it will be held operated in spite of the interruptions of its circuit.

In response to the 10 interruptions of the circuit of relay 311 by the dial 101, switch 300 will be stepped to position 15. When brush 304 reaches position 14, a circuit is closed from battery on conductor 316, brush 304, winding of relay 334, outer left front contact of relay 322 to ground. Relay 334 operates and closes a locking circuit for itself through the winding of relay 328 to battery at its inner right front contact. Relay 328 is prevented from operating at this time by the battery on brush 304. The operation of relay 334 also closes a second holding circuit for trip magnet 331 over its front contact to battery at the right front contact of relay 311. When switch 300 steps into position 15 from position 14, the shunt is removed from relay 328 and that relay operates, relay 311 being operated at this time. Magnet 331 is held operated at the front contact of relay 311. When relay 311 releases for the tenth pulse, relay 327 and trip magnet 331 will release. The release of relay 327 prevents the reclosure of the circuit of trip magnet 331. The release of trip magnet 331 permits the trip arm to come in contact with one of the commutator segments of strip 335. The trip arm remains in frictional contact with the commutator segment to indicate the distance traversed by the pendulum during the time that the dial sent out ten pulses. Assuming that the trip arm made contact with segment 340, a circuit is closed from ground over the trip arm 352, segment 340, left back contact of relay 224, winding of relay 230 to battery on conductor 316. Relay 230 operates and closes a circuit from tone source 227 through high speed interrupter 231, left front contact of relay 230, right winding of relay 225, No. 15 terminal of arc 304 to battery on conductor 316. This tone will be induced in the subscriber's dial circuit and will be received by the test man at the substation. This tone indicates that the dial is too fast, since the pendulum had not swung far enough before the completion of the ten pulses.

Relay 219 was released, and the monitoring circuit opened during dialing, but at the completion of dialing a circuit is reestablished for relay 219 and the monitoring circuit is again completed. The test operator will therefore also hear the tone. This also affords an opportunity for the test man to instruct the test operator for any purpose.

Had the trip arm 352 been released to make contact with either segment 337, 338 or 339 a circuit would have been closed from battery on conductor 316 through the winding of OK relay 229, right back contact of relay 224 to segment 338 or over a back contact of relay 310 to segment 337 or 339 and thence through the trip arm 352 to ground. The operation of relay 229 connects ringing current from source 232 over its front contact to the right winding of relay 225 thus producing ringing current tone in the receiver at the subscriber's substation and indicating to the testman that pulsing has been at the right speed. If the trip arm is released to make contact with segment 336, a circuit is closed from battery on conductor 316 through the winding of relay 228, segment 336, trip arm 352 to ground. The operation of relay 228 completes a circuit from tone source 227 through slow interrupter 233, front contact of relay 228 to the right winding of relay 227 producing a slowly interrupted tone in the substation receiver to indicate that pulsing was too slow.

If the dial has proved too slow or too fast, the test man may repeat the test after adjustment by restoring the receiver at the substation to the switchhook for a moment. The restoration of the receiver opens the circuit of relays 225 and 311, causing these relays to release. The release of relay 225 opens a circuit of relay 318 which in turn opens the circuit of relays 322 and 312. The release of relay 312 turns the operating circuit for magnet 313 to the control of relay 314. A circuit for operating relay 314 may be traced from battery at the right back contact of relay 322, right back contact of relay 312, strapped terminals of arc 301, left back contact of relay 312, back contact of magnet 313, winding of relay 314 to ground. Relay 314 operated steps switch 300 to position 16. The above traced circuit for magnet 313 is reclosed in position 16 and the switch stepped in this manner to its normal position. With switch 300 in position 16 relay 345 is operated in a circuit from ground through the winding of relay 345, No. 16 terminal of brushes 304 and 303 to battery. Relay 345 locks over its inner right contact, right front contact of relay 315 to battery at the outer right contact of relay 345. Relay 315 is held operated during the advance of switch 300 to normal by its slow to release character. When switch 300 reaches normal the circuit of relay 315 is permanently opened and relay 345 releases. Relay 345 while operated extends battery from its outer right front contact to conductor 316 in substitution for the battery removed therefrom by the release of relay 322. This serves to hold relay 222 operated. With switch 300 normal and relay 340 released, the holding circuit of relay 222 is opened and that relay releases. With relay 222 released the holding circuit of relay 214 is dependent entirely upon relay 223, which it will be remembered is held operated through key 108 and relay 109.

To repeat the test the test man again removes the receiver at the substation 100 from the hook, reoperating relays 311 and 225. The operation of relay 311 causes the advance of switch 300 in the manner previously described and the test may be repeated.

If it is desired to test the dial at substation 100 under readjust limits, the key 113 may be restored and key 114 operated whereupon the condition set up will be that of the readjust standards. As previously stated, the operation of key 114 closes a circuit for operating either relay 310 or relay 346 according to the speed of dial under test. In the present case, relay 310 would be operated and would lock over the back contact of relay 346 and back contact of relay 345 to battery on conductor 316. The operation of relay 310 regroups the segments of strips 335.

In order to use the same apparatus for testing a high speed dial, as previously indicated relay 224 readjusts the segment arrangement so as to test dials which normally pulse at the rate of 20 pulses per second. Relay 346 performs the same functions for a high speed dial as relay 310 does for a low speed dial. The following table sets forth indication given under the various test conditions.

|  |  | Fast. | OK. | Slow. |
|---|---|---|---|---|
| Relay 224, normal (10 pulse dial). | Relay 310, normal (test limits). | 340 to 344 | 337 to 339 | 336 |
|  | Relay 310, operated (readjust limits). | 339 to 344 | 338 | 336, 337 |
| Relay 224, operated (20 pulse dial). | Relay 346, normal (test limits). | 344 | 341 to 343 | 336 to 340 |
|  | Relay 346, operated (readjust limits). | 343, 344 | 342 | 336 to 341 |

It will be apparent from the above table that when making a readjust test the OK condition is confined to much narrower limits than otherwise.

Should the dial be so slow as not to complete ten pulses by the time the pendulum completes its first half vibration, a projection on the pendulum engages one on key 347, opening contact 330 and releasing the trip arm 352 to engage segment 336.

In order to disconnect, it is necessary that key 108 be restored. The restoration of this key opens the circuit of relay 109 and relay 223 thus releasing the apparatus completely and restoring it to normal. If the dial test circuit is selected and the test abandoned without operating one of the keys 111 to 114, no circuit will have been completed for relay 311 and switch 300 will not have been moved off normal. Hence the restoration of dial test key 108 releases the circuit immediately. If one of the test keys 111 to 114 has been operated so that switch 300 has been moved off normal in a manner previously described, the advance of the switch to position 5 will be as above set forth. The restoration of the test key or of the subscriber's receiver releases relay 311 and with switch 300 in position 5 and relay 311 de-energized a circuit may be traced from battery at the back contact of relay 311 over the back contact of relay 333, front contact of relay 312, winding of relay 315, winding of magnet 313 to ground, stepping switch 300 to terminal 6. With relay 311 released the locking circuit of relay 317 to the holding magnet 321 is open and that relay is released. The release of relay 317 opens the circuit of relay 318 and that relay also releases, in turn releasing relays 322 and 312. The release of relay 322 closes battery over its outer right back contact, back contact of relay 312, strapped terminals of arc 301, left back contact of relay 312 back contact of magnet 313, winding of relay 314 to ground restoring switch 300 to normal. Relays 222 and 214 are held operated until the switch reaches normal in the manner previously described.

The circuit is provided with a make-busy jack 212. The insertion of a plug in this jack opens the circuit of relays 213 and 220 preventing any line on which switch 200 might be resting from being made busy. It also opens the circuit for controlling magnet 207 preventing the switch 200 from moving in a hunting operation. It also opens the circuit of relay 214 preventing the closure of the conductors from the test cord, and thus preventing interference with any test cord on the terminals of which switch 200 might be standing. In addition it closes a link in a chain circuit through the dial tester circuits which operates relay 234 and lights lamps 235 when all the dial tester circuits are busy.

Keys 347 and 348 are provided to permit checking the calibration of the pendulum whenever desirable. The tester circuit is made busy as above described. The operation of key 347 closes a circuit from ground over the contact 349 through the winding of relay 311 operating that relay. The operation of relay 311 causes the stepping of switch 300 in the manner previously described. Relay 317 is operated and locked as before except that the locking circuit is transferred to the control of key 348 by the operation of key 347. The circuit of relay 327 and its locking circuit through the trip magnet 331 is also closed, holding the trip arm out of the path of the pendulum. When the pendulum is set, the operation of key 348 releases the pendulum and permits it to oscillate freely. A window in the case of the pendulum permits observation of the movement and the rate of vibration may be determined in any well known manner. After the check has been completed the restoration of keys 348 and 347 permits the restoration of this circuit to normal and the removal of the plug from jack 212 renders the circuit available for testing purposes.

What is claimed is:

1. In a telephone exchange system, an operator's position, a test circuit available to said position, a telephone circuit, an impulse transmitter associated therewith, means at said position for connecting said test circuit with said telephone circuit, means in said test circuit controllable over said telephone circuit to determine the speed of pulsing by said transmitter, and means to transmit a signal to said telephone circuit to indicate said speed.

2. In a telephone exchange system, an operator's position, a test circuit available to said position, a telephone circuit, an impulse transmitter associated therewith, means at said position for connecting said test circuit with said telephone circuit, means in said test circuit controllable over said telephone circuit to determine the relative speed of pulsing by said transmitter, and means to transmit a characteristic tone to indicate said relative speed.

3. In a telephone exchange system, an operator's position, a test circuit available to said position, telephone circuits, impulse transmitters associated with said circuits, said transmitters having different normal pulsing rates, means at said position for connecting said test circuit with a telephone circuit, means in said test circuit controllable over said telephone circuit to determine the relative speed of pulsing by the transmitter associated with said telephone circuit, and means controllable from said position to arrange said test circuit to function at the normal pulsing rate of the transmitter under test.

4. In a telephone exchange system, an operator's position, a test circuit available to said position, a telephone circuit, an impulse transmitter associated therewith, means at said position for connecting said test circuit with said telephone circuit, means in said test circuit controllable over said telephone circuit to determine the relative speed of pulsing by said transmitter, means to transmit a characteristic signal to indicate whether the speed of pulsing is satisfactory, and means to vary the range of speeds which shall be satisfactory.

5. In a telephone exchange system, a plurality of test operators' positions, a test circuit common to said test positions, a telephone circuit, an impulse transmitter associated therewith, means at each of said positions for connecting said test circuit with said telephone circuit, means in said test circuit controllable over said telephone circuit to determine the relative speed of pulsing by said transmitter, and means to transmit a signal over said telephone circuit to indicate said relative speed.

6. In a telephone exchange system, a plurality of test operators' positions, a test circuit common to said test positions, a telephone circuit, an impulse transmitter associated therewith, means at each of said positions for connecting said test circuit with said telephone circuit, means in said test circuit controllable over said telephone circuit to determine the relative speed of pulsing by said transmitter, and means to transmit a characteristic tone to indicate said relative speed.

7. In a telephone exchange system, a plurality of test operators' positions, a test circuit common to said test positions, telephone circuits, impulse transmitters associated with said circuits, said transmitters having different normal pulsing rates, means at each of said positions for connecting said test circuit with a telephone circuit, means in said test circuit controllable over said telephone circuit to determine the relative speed of pulsing by the transmitter associated with said telephone circuit, and means controllable from said position to arrange said test circuit to function at the normal pulsing rate of the transmitter under test.

8. In a telephone exchange system, a plurality of test operators' positions, a test circuit common to said test positions, a telephone circuit, an impulse transmitter associated therewith, means at each of said positions for connecting said test circuit with said telephone circuit, means in said test circuit controllable over said telephone circuit to determine the relative speed of pulsing by said transmitter, means to transmit a characteristic signal to indicate to said telephone circuit whether the speed of pulsing is satisfactory or unsatisfactory, and means to vary the range of speeds which shall be satisfactory.

9. In a telephone exchange system, a plurality of test operators' positions, a test circuit common to said test positions, a telephone circuit, an impulse transmitter associated therewith, means at each of said positions for associating said test circuit with said telephone circuit, means in said test circuit controllable over said telephone circuit to determine the relative speed of pulsing by said transmitter, and means to repeat said test without reestablishing the circuits connecting said impulse transmitter with said test circuit.

10. In a telephone exchange system, a plurality of test operators' positions, a dial test circuit common to said test positions, a subscriber's substation, a dial thereat, means at each of said positions for associating said dial test circuit with said substation, means in said dial test circuit controllable from said substation to determine the relative speed of pulsing by said dial and means to transmit a tone of one character to indicate that the speed of said pulsing is correct and to transmit tone of a different character to indicate that the speed of said pulsing is incorrect.

11. In a telephone exchange system, a plurality of test operators' position, a dial test circuit common to said test positions, a subscriber's substation, a dial thereat, means at each of said positions for associating said dial test circuit with said substation, means in said dial test circuit controllable from said substation to determine the relative speed of pulsing by said dial means to transmit a tone of one character to indicate that the speed of said pulsing is correct, to transmit a tone of a different character to indicate that the speed of said pulsing is incorrect and means to interrupt said latter tone at different rates to differentiate pulsing which is too fast from pulsing which is too slow.

12. In a telephone exchange system, a plurality of test operators' positions, a dial test circuit common to said test positions, a subscriber's substation, a dial thereat, means at each of said positions for associating said dial test circuit with said substation, means in said dial test circuit controllable from said substation to determine the relative speed of pulsing by said dial and means to retest said dial under the same or different conditions without reassociating said dial test set with said dial.

13. In a telephone exchange system, a plurality of test operators' position, a dial test circuit common to said test positions, a subscriber's substation, a dial thereat, means at each of said positions for associating said dial test circuit with said substation and for determining the test conditions to be imposed, means in said dial test circuit controllable from said substation to determine the relative speed of pulsing by said dial and means to transmit a signal to said substation to indicate said relative speed.

In witness whereof, I hereunto subscribe my name this 25th day of June A. D., 1926.

ROBERT B. MILLER.